United States Patent

Tremblay et al.

[15] 3,660,609

[45] May 2, 1972

[54] SUBSCRIBER LONG LINE EXTENDER

[72] Inventors: Hubert J. Tremblay, Roselle; Frank V. Mellien, Jr., Lombard, both of Ill.

[73] Assignee: Communications Systems Corporation, Morton Grove, Ill.

[22] Filed: Aug. 22, 1969

[21] Appl. No.: 852,203

[52] U.S. Cl. ....................179/16 F

[51] Int. Cl. ....................H04m 1/76, H04g 1/30

[58] Field of Search ....................179/16 E, 16 F, 17 R, 17 A, 179/18 F, 18 FA, 18 FH, 16 R, 170 R, 170 D, 170 J, 170 T, 18 H, 8.5

[56] References Cited

UNITED STATES PATENTS

| | | | |
|---|---|---|---|
| 1,579,237 | 4/1926 | O'Neil | 179/16 E |
| 2,055,647 | 9/1936 | Bowne | 179/16 F |
| 2,282,465 | 5/1942 | Edwards | 179/170 D |
| 2,535,765 | 12/1950 | Voss | 179/17 A |
| 2,810,081 | 10/1957 | Elliott | 179/170 T |
| 3,166,642 | 1/1965 | Abott | 179/170 T |
| 2,938,955 | 5/1960 | Molnar | 179/16 E |
| 3,083,265 | 3/1963 | Paulaitis et al. | 179/170 R |
| 3,187,105 | 6/1965 | Parry | 179/16 E |

FOREIGN PATENTS OR APPLICATIONS

| | | | |
|---|---|---|---|
| 1,084,382 | 9/1967 | Great Britain | 179/16 E |

*Primary Examiner*—Kathleen H. Claffy
*Assistant Examiner*—Randall P. Myers
*Attorney*—Hume, Clement, Hume & Lee

[57] ABSTRACT

A subscriber long line extender for use in the subscriber loop of a telephone network to extend the operating limits for the subscriber lines connecting a subscriber telephone to the central office equipment and the central office voltage source comprising a signalling circuit which is operably connected to brake the subscriber line and further operable in response to the current generated by the subscriber telephone being placed in an off-hook condition to provide closed circuit to the central office equipment indicative of the off-hook condition of the subscriber telephone and independent of any impedance in the subscriber loop.

A second auxiliary feature of the subscriber long line extender provides for a hybrid amplifier to be used in conjunction with the above signalling circuit to enable simultaneous two-way transmissions between the subscriber telephone and the central office equipment, and an isolating means connected between the hybrid amplifier and the signalling circuit to prevent interaction between the signalling and amplification functions.

13 Claims, 3 Drawing Figures

Inventors.
Hubert J. Tremblay &
Frank V. Mellien, Jr.
By Hume, Clement, Hume & Lee
Attys.

Inventors.
Hubert J. Tremblay,
Frank V. Meltzer, Jr.
By. Hume, Clement, Hume & Lee
Attys Inventors.
Hubert J. Tremblay &
Frank V. Melfjen, Jr.
By. Hume, Clement, Hume & Lee
Attys.

SUBSCRIBER LONG LINE EXTENDER

BACKGROUND OF THE INVENTION

The present invention relates to telephone systems and more particularly to telephone systems including subscriber line loops having greater than a pre-determined length.

With the development of the national dial telephone network it has become possible to connect virtually any telephone in the country with any other telephone without human assistance at any point. Since all operating telephone companies are involved in the network and many types of equipment are utilized, it has become necessary to establish standards which assure compatibility of equipment and uniformity of performance.

One of the more critical performance areas involved in this standardization is the transmission requirement which has been so established as to assure essentially the same volume level on all telephone calls regardless of the distance between the telephone and the connected central office equipment. One segment of the overall transmission requirement of concern is the subscriber loop. The subscriber loop is that portion of a telephone circuit which includes all equipment and facilities used to connect the central office equipment to the telephone instrument. In order to operate satisfactorily within the overall telephone network, the standard requires that subscriber loops introduce no more than 8 decibels of loss into the telephone talking circuit.

In a similar fashion, the telephone must operate compatibly with central office equipment in a number of other ways — raising the dial tone, dialing, ringing and "tripping" or stopping the ring on incoming calls. In order for these assorted functions, collectively termed signalling, to be performed reliably and consistently, the current in the subscriber loop with the receiver in the off-hook condition must be maintained above the minimum levels required to activate the appropriate central office equipment. Stated another way, the resistance in the subscriber loop must be maintained below the rated maximum for the central office equipment involved, typically 1,000 to 1,200 ohms resistance in the conductor portion, 150 to 200 ohms in the instrument and 400 ohms in the central office equipment.

Thus, there exist two basic limitations in the design of any subscriber line. First, the resistance limit which is so established as to permit the telephone user to perform signalling functions into the central office equipment. Second, the transmission limit which is established to assure the telephone user adequate talking level no matter into what combination of equipment he may be connected.

In general, these two limitations have been satisfied in the past by using larger gauge wire with its inherently lower resistance and attenuation in the conductor loop on long lines. With the growing demand for utility services, even in far outlying areas, and the increasing cost and limited availability of copper, simply increasing wire size to extend subscriber lines has not proved entirely satisfactory.

A second method for extending service has been to utilize amplifiers. The "negative impedance" amplifier which was developed for, and which is usually used on interoffice trunk circuits, has been used on a limited basis on subscriber lines. However, they have not proved entirely satisfactory since they provide amplification and do not increase the signalling range of the circuits involved. Furthermore, they introduce additional resistance into the loop and thereby further aggravating the above mentioned resistance problem.

A third method for extending signalling ranges has been to utilize a shunt resistor across the subscriber line which conducts current from the central office at all times. This shunt current, insofar as the central office equipment is concerned, is additive to the current which flows through the subscriber line and the subscriber telephone instrument.

Lastly, another technique for extending signalling limits involves the introduction of additional voltage into the subscriber loop by the use of a voltage booster. The central office switching equipment is normally powered from a 48 volt DC supply. Using this 48 volt supply as a source, the voltage booster converts DC to AC and back to DC in order to generate an additional 48 volts DC which is applied in the subscriber loop in series with the basic 48 volt supply, thereby providing a total of 96 volts and increasing the line resistance limit.

Although such methods have served the purpose, they have not proved entirely satisfactory under all conditions of service. The present invention provides a means for overcoming these difficulties.

SUMMARY OF THE INVENTION

The general purpose of this invention is to provide a subscriber long line extender which embraces all the advantages of similarly employed extenders and possesses none of the afore-described disadvantages. To attain this, the present invention contemplates the utilization of a signalling circuit between the subscriber telephone and the central office equipment connected to break the subscriber line in response to the current generated by the subscriber telephone being placed in an off-hook condition wherein the signalling circuit provides a short circuit to the central office equipment indicative of the off-hook condition of the subscriber telephone and independent of any impedance in the subscriber loop.

By adding an isolating means to the signalling circuit, the signalling circuit may be used in conjunction with a hybrid amplifier for allowing the simultaneous two-way amplified transmission between the subscriber telephone and the central office equipment. Furthermore, a voltage booster circuit is also included which may be optionally utilized to aid the central office in initiating switching operations in response to the off-hook condition of the subscriber telephone. The booster circuit is connected so as to be operative only during the off-hook condition of the subscriber telephone.

Therefore, an object of the present invention is the provision of a long line extender which provides a method of extending the signalling range and is also capable of providing voice amplification.

Another object is to provide a signal to the central office equipment indicative of the off-hook condition of a subscriber telephone independent of any impedance in the subscriber loop.

A further object is to provide for the automatic inclusion of range extension circuitry in series with a long line circuit during a conversation connection.

Still another object is to provide automatic means to assist the central office automatic billing equipment in determining which of two parties on a two-party subscriber line is utilizing the telephone equipment.

Yet another object is to provide an optional voltage boosting circuit which need not be operable at all times.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
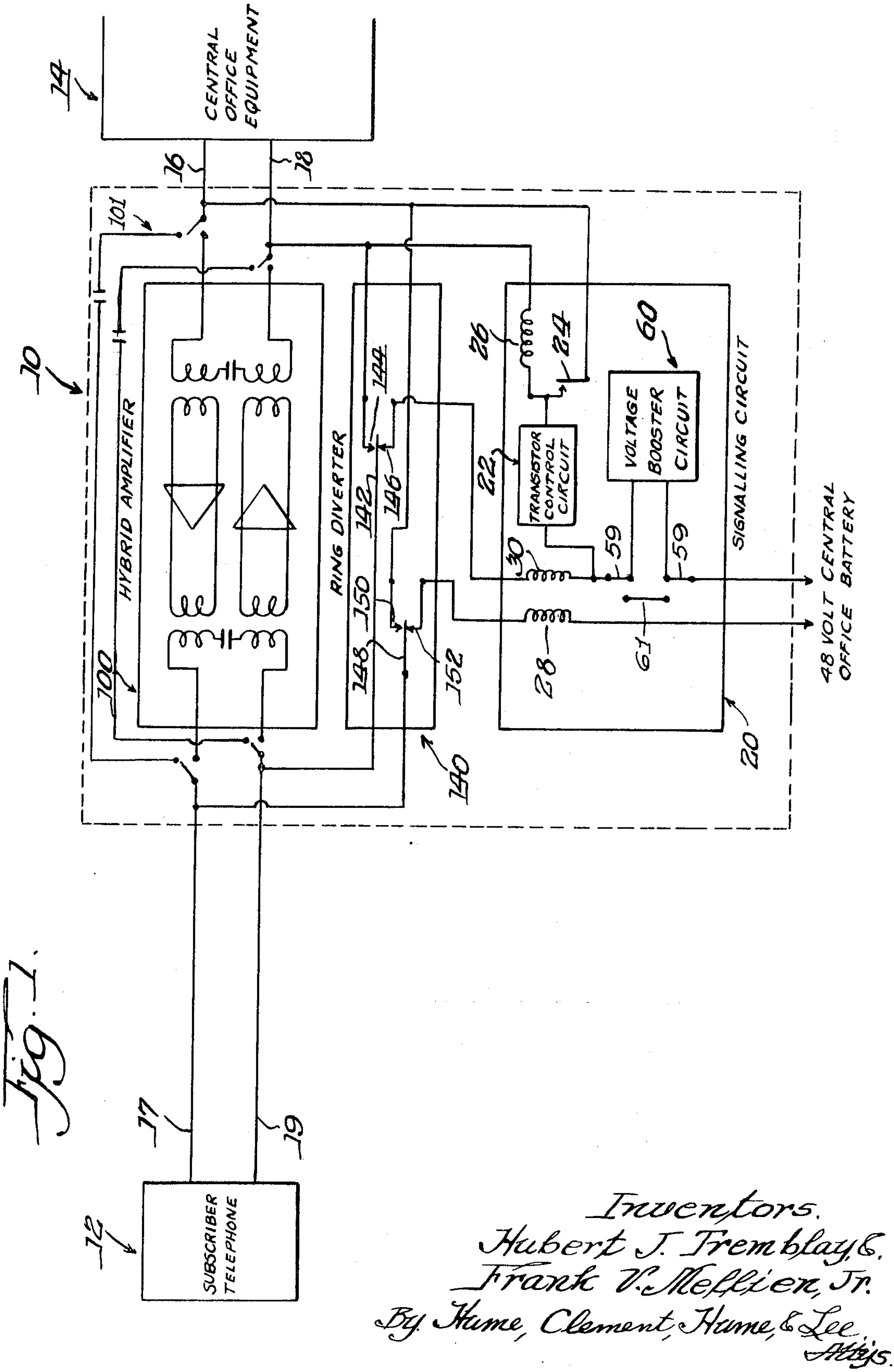
FIG. 1 is a block diagram of the long line extender.

Referring now to the drawings wherein like reference characters designate like or corresponding parts throughout the several views, there is shown in FIG. 1, which illustrates the preferred embodiment, a long line extender 10 which is connected in the subscriber loop of a telephone system between the subscriber telephone 12 and the central office equipment 14. Broadly, the long line extender 10 comprises a signalling circuit 20 which is designed to extend signalling ranges. By utilizing only the signalling circuit 20 in conjunction with the central office equipment 14 and the subscriber telephone 12, the normal signalling range will be approximately doubled and will only utilize the regular central office battery which is applied to the telephone line. If further amplification is required, a hybrid amplifier 100 is added to signalling circuit 20 and this provides audio amplification. An additional optional feature which may be used with or without amplifier 100 is voltage booster circuit 60. This optional feature further extends signalling ranges to above 3,000 ohms. Regardless of which combination of component elements is utilized, printed circuit techniques may be used throughout and the parts may be interchanged and intermixed without affecting characteristics from one unit to another.

Signalling circuit 20 acts to actually break the subscriber line between the central office equipment and the subscriber telephone into two separate loops. It accomplishes all the signalling functions by repeating the actions which take place at the subscriber telephone 12 in the long line extender equipment 10. Long line extender 10 may be physically located in the central office. In this way the signalling requirement of the central office is met by the selection of components in the extender. The signalling circuit 20 is comprised essentially of a transistor control circuit 22, a switch 24, which is actuated by transistor control circuit 22, and three inductors, 26, 28 and 30. Signalling circuit 20 detects the off-hook condition of the subscriber telephone 12 as soon as a few milliamps of current are caused to flow in the subscriber line, 17, 19. When a small amount of current begins to flow, indicative of the off-hook condition of subscriber telephone 12, the transistor control circuit 22 is rendered conductive which in turn causes normally open switch 24 to close, thus establishing a closed circuit through inductor 26 to the central office equipment 14. Thus, in response to only a few milliamps of current flow in the subscriber line, 17, 19, a current of any desired value, typically 30 milliamps, is caused to flow to activate the central office switching.

For example, by utilizing this technique, proper signal can be maintained with the subscriber loops of up to 10,000 ohms. Because conventional telephone instruments employ a carbon microphone, a current in the subscriber line of at least 20 milliamps is required for proper talking levels. With this 20 milliamp requirement in the subscriber line, long line extender 10 maintains proper signalling operation with up to 2,150 ohms of cable resistance without employing any additional voltage.

If it is required that an additional extension beyond this 2,150 ohms is required, an optional voltage booster circuit 60 may be utilized. If the voltage booster circuit 60 is not utilized, the switch means 59 may be connected to a suitable bypass circuit means 61, thereby effectively eliminating or replacing the voltage booster circuit 60 in the long line extender 10. The voltage booster circuit 60 may be a multi-vibrator or a DC-AC-DC convertor. This circuit introduces approximately 20 volts of additional voltage in series with the line during the off-hook condition only. Since signalling circuit 20 is fully functional down to only a few milliamps, there is no need for a full time booster circuit to be employed and, therefore, voltage booster circuit 60 is disabled when subscriber telephone 12 is not in use. By this means, the voltage appearing on the subscriber premises is always maintained at the conventional 48 volt level. At no time is the voltage anywhere in the circuit in excess of approximately 70 volts.

If further voice amplification is required for long line use, a hybrid amplifier 100 may be inserted in the subscriber line circuit. By actually splitting the subscriber line through the use of signalling circuit 20, the need to use a negative impedance amplifier with its limited gain characteristics is eliminated. A hybrid amplifier or repeater 100 may be used as part of long line extender 10 to provide an inherently higher gain capability and thus a greater range extension. If the hybrid amplifier 100 is not utilized, an alternate path 101 may be inserted to effectively bypass or replace the hybrid amplifier 100 in the long line extender 10.

Lastly, because signalling circuit 20 interrupts the continuity of the central office line circuit and the subscriber line circuit, it is necessary to make provision for the ringing current, necessary to ring the subscriber's telephone on a terminating call, to bypass the long line extender circuitry 10. A ring diverter circuit 140 is provided for this purpose. Ring diverter circuit 140 broadly comprises a pair of switches, 142, 148, which when actuated to contacts 144 and 150, respectively, provide a through circuit for the ringing current while the ringing current is being applied to the line. This allows the ringing current to bypass signalling circuit 20 of long line extender 10 and enables the telephone to be answered in normal fashion.

Figure 2:
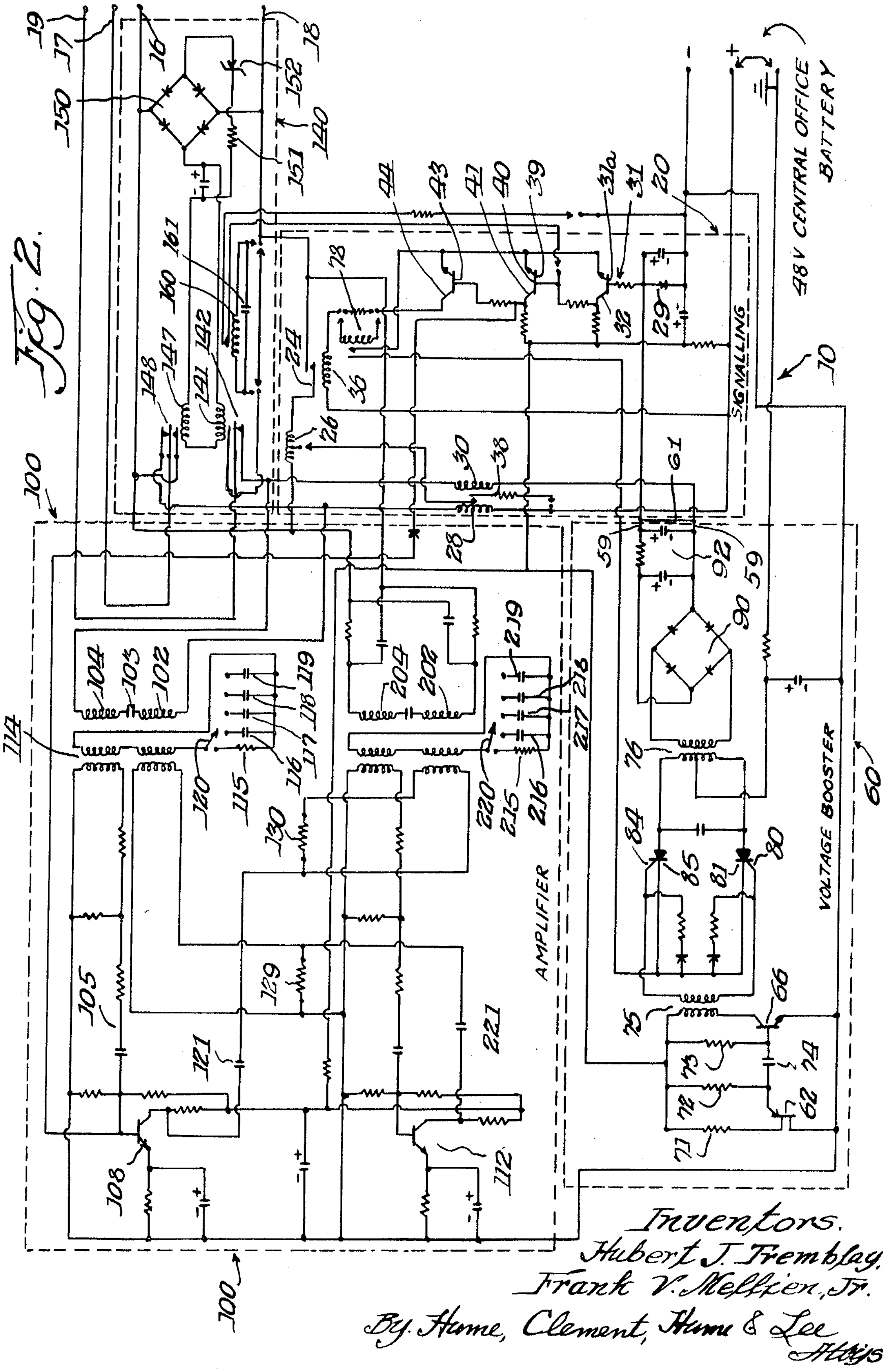
FIG. 2 is a schematic diagram of the long line extender shown in FIG. 1.

Now, referring to FIG. 2 in connection with FIG. 1, long line extender 10 will be shown in more detail. Signalling circuit 20 comprises three transistors, 31, 40 and 44, having associated biasing resistors and capacitors. These transistors as well as their biasing circuitry comprise transistor control circuit 22. Also included in signalling circuit 20 are inductors 26, 28 and 30. A relay winding 36 is also provided to control a switch 24 which establishes a circuit from the central office through inductor 26 under the influence of transistor 44. The signalling circuit 20 is connected to the 48 volt central office battery. A negative 48 volts is fed through diode 29, through inductor 30, and out to subscriber line 19. If a voltage booster circuit 60 is used, the 48 volts is fed through diode 29, then into the booster circuit 60, and then through inductor 30 and out to subscriber line 19. The other side of the subscriber line 17 returns through inductor 28 to the positive side of the 48 volt central office battery source, which by convention in the telephone industry is also connected to ground.

When the subscriber lifts his telephone receiver 12 and places it in the off-hook condition, a current is caused to flow in signaling circuit 20. This current results in a voltage drop across diode 29 which applies a small positive potential to the base 31*a* of the normally off transistor 31, causing transistor 31 to conduct. Transistor 31 conducting, places collector 32 of transistor 31 and base 39 of transistor 40 at a negative 48 volt potential, thus cutting off the normally conducting transistor 40. The cutting off of transistor 40 results in a positive potential at collector 41 of transistor 40 and at the base 43 of transistor 44. This causes normally off transistor 44 to conduct. The conducting of transistor 44 energizes relay winding 36, causing switch 24 to close the circuit from central office line 18 through inductor 26, and back out on central office line 16. By closing switch 24, an effective closed circuit is provided to the central office equipment 14.

Inductors 28 and 30 effectively decouple signalling circuit 20 from the voice path between the central office equipment 14 and the subscriber telephone 12 by providing a low resistance to DC current, but a high impedance at voice frequencies. Similarly, inductor 26 presents a specified resistance to DC current in the central office circuit, but a high impedance to the audio frequencies carried in the same circuit. In this way, the signalling circuit performs the DC signalling functions without interference with the voice circuit that is connected across it.

In a preferred embodiment, inductor 26 presents a 1,200 ohm closed circuit to the central office equipment when switch 24 is closed. Thus, a very low current, as low as 5 milliamps, in the subscriber loop results in a current selected to be between 30 to 35 milliamps in the central office circuit. Since signalling circuit 20 is composed of solid-state components, it is capable of virtually instantaneous reaction and presents an appropriate closed circuit to the central office equipment in response to a low current in the subscriber loop for the performance of such functions as raising the dial tone, dialing, tripping the ring, etc.

An additional feature is also provided in signalling circuit 20. Because of the universal application of automatic message accounting systems in the telephone industry, it is particularly necessary to identify specific telephones on two-party lines. The automatic equipment in the central office identifies telephone subscribers by number and association with any central office line circuit. In the case of two-party service, the central office equipment identifies the telephone numbers involved but needs further information to determine which of the two parties is making a particular call. This identification is established by the method of connection of the telephone on the subscriber's premises. In the case of two-party service, the second telephone of the two-party line has a ground connection introduced through the induction coil of the telephone set onto the subscriber loop when in the off-hook condition. The automatic billing equipment in the central office detects this ground connection and charges the telephone number identified as being the second party. The absence of a ground connection constitutes identification of the first party of the two-party line.

In order to maintain this capability, inductors 28 and 30 of signalling circuit 20 in long line extender 10, which have been designed to perform inductive isolation, described above, also perform as a differential relay. The core of the two inductors and the associated mounting iron are so fabricated as to provide a magnetic gap at the center of the two coils. A glass reed switch 38 is installed at the point of this magnetic gap. Inductors 28 and 30 are connected to present equal and opposite magnetic fields at this point in a normal closed loop, ungrounded situation. With these equal and opposite magnetic fields at work, switch 38 does not operate. However, when there is a ground at the subscriber's instrument, its effect is to increase the current in inductor 28 and decrease the current to the same degree through inductor 30, thus providing a differential magnetic field at the magnetic gap. In this condition, switch 38 operates, thus closing a connection to provide a ground to inductor 26 and thus relaying the subscriber instrument ground information to the central office equipment 14 and providing necessary information so that the central office will known that party number two, i.e., the party with the ground connection attached to the telephone set, has placed the subscriber set in an off-hook condition.

Next, voltage booster circuit 60 will be described. It is to be recognized as explained above, that voltage booster circuit 60 may optionally be used to supply an additional voltage to signalling circuit 20 when long line extender 10 is being utilized in operation with a cable resistance of more than approximately 2,150 ohms. In conditions under 2,150 ohms of cable resistance, a voltage booster circuit is not necessary for the proper operation of long line extender 10 and may be excluded from the unit. Since long line extender 10 is modular, any individual modular part such as voltage booster circuit 60 or hybrid amplifier 100, may be eliminated without affecting the remaining circuitry.

Voltage booster circuit 60 is an incremental booster and is activated only when the subscriber telephone 12 is in the off-hook condition. The voltage booster circuit 60 is comprised of transistors 62 and 66, and SCR's 80 and 84, and associated circuitry. Unijunction transistor 62 and transistor 66 are connected to form a free-running relaxation oscillator which is operating continuously. In one preferred embodiment, the circuit range of oscillation is approximately 150 to 4,000 cycles per second. The frequency is dependent on the selection of values of resistor 71, 72, 73 and capacitor 74. This oscillation causes an output of alternating positive and negative pulses which are fed through transformer 75 to the gates 81 and 85 of SCR's 80 and 84, respectively. In response to the pulses received at gates 81 and 85, SCR's 80 and 84 alternatively conduct, inducing an AC current into the secondary of transformer 76. The ground connection to the cathode circuit of SCR's 80 and 84 is connected to a relay winding 78 in the signalling circuit 20. Therefore, SCR's 80 and 84 of voltage booster circuit 60 is inoperative except when the subscriber telephone has been placed in the off-hook condition, thereby inducing a current in relay winding 78.

The AC voltage induced in the secondary of transformer 76 is rectified and introduced in series with the subscriber line 19 by means of bridge rectifier 90. A filtering circuit 92 is also provided. Thus, the circuit may be designed to provide any reasonable voltage to be introduced in series with the subscriber line. However, in a preferred embodiment the circuit is designed to provide approximately 20 additional volts which is adequate to meet a requirement of 20 milliamps of current in a 3,000 ohm subscriber loop. At the same time, 20 volts in series with the central office equipment's 48 volts remains within the underwriter's laboratory requirement which is conventionally used in the telephone industry of 72 volts or less.

When additional voice amplification is required along with the long line extender signalling circuitry, a hybrid amplifier 100 may be added in circuit between the central office equipment 14 and the subscriber telephone 12 without affecting the signalling quality of the signalling circuit 20. Hybrid amplifier 100 actually comprises two one-way amplifiers connected in the hybrid configuration. The subscriber loop 17, 19, entering long line extender 10, is connected to two transformers 102 and 104. These connections are in parallel with the connection to the subscriber side of the signalling circuit 20. However, audio frequency signals in the voice range which enter the circuit are isolated from signalling circuit 20 by inductors 28 and 30 as described above. These audio signals are introduced into the primaries of transformers 102 and 104 in series with a capacitor 103 whose purpose is to exclude the DC current from the transformer.

The secondary of transformer 104 is connected through a voltage divider 105 to the input of transistor 108. The secondary of transformer 102 is connected to the output of transistor 112 which is a reverse direction amplifier transistor. A tertiary or intermediate winding 114 is provided in transformers 102 and 104, and its polarity is such that the energy which would normally be coupled into the secondary of transformer 102 is absorbed in the adjustable balance network comprised of resistor 115 and capacitors 116, 117, 118 and 119. While only four capacitors are shown, it will be recognized that any number of capacitors may be utilized. Contact 120 may be adjusted to include any number of capacitors in parallel with resistor 115 to provide a proper balancing network which is adjusted to balance the individual subscriber line that is connected to the long line extender 10. The effect of this hybrid action is a strong signal coupled to the input of transistor 108, and only a very low level signal is transferred through transformer 102 to the output circuit of amplifier transistor 112.

Transistor 108 provides amplification of the signal received over the subscriber line and transferred through transformers 102 and 104. This signal is coupled through a capacitor 121 into the secondary winding of transformer 202. Again, due to the polarity arrangement of the hybrid transformer pair 202, 204, energy is transferred into the primary windings of transformers 202 and 204 in series, but very little energy is transferred back to the secondary of transformer 204. The amplified signal induced into the primaries of transformers 202 and 204 is fed out into the central office circuit along subscriber lines 16 and 18. Similarly, audio signals originating at the central office side are fed into the primaries of transformers 202 and 204, then to the input of transistor 112 through a capacitor 221 to hybrid pair transformers 102 and 104, and out on to the subscriber line 17, 19, and to the subscriber telephone 12. This arrangement provides a full duplex transmission, i.e., simultaneous conversation in both directions. Gain may be controlled incrementally by the selection of different values for resistors 129 and 130. Furthermore, the balancing effect of hybrid pair transformers 202 and 204 may be changed in a manner similar to that described with respect to transformers 102 and 104 above by merely changing the number of capacitors in circuit by moving contact 220 to balance the amplifier for the particular telephone circuit with which it is being utilized.

Because long line extender 10 interrupts the continuity of the central office line circuit 16, 18, and the subscriber line circuit 17, 19, it is necessary to make provision for the ringing current necessary to ring the subscriber instrument 12 on a terminating call to bypass long line extender circuitry 10. A ring diverter circuit 140 is provided for this purpose. Broadly, ring diverter circuit 140 comprises a bridge rectifier circuit 150 and a pair of switches, 142 and 148. Ringing current is approximately 105 volt, 20 cycle, AC current superimposed onto the normal 48 volt DC supply and is introduced across the central office line 16, 18. The current is fed along line 16 through bridge rectifier 150 through the relay windings 141 and 147 associated with switches 142 and 148 back through resistor 151, zener diode 152, through the bridge circuit to line 18. Zener diode 152 is provided in order to prevent central office battery surges from triggering the ring diverter circuitry and it causes the ring diverter circuitry sensitive only to the high voltage ringing supply. When ring diverter circuit 140 is operative, relaywindings 141 and 147 are operated. Switch contacts 142 and 148 connect lines 16 and 17 together and lines 18 and 19 together, thereby establishing a through connection for the ringing current which bypasses signalling circuit 20 and hybrid amplifier 100 while the ringing current is applied to the line. Since the ringing current is applied intermittently, the telephone may be answered in normal fashion between cycles of ring current on the line.

An additional feature is provided which allows tripping the ring either during ring or silent intervals. This is accomplished by inserting a relay 160 and a capacitor 161 into the circuit in the ring path only. As long as the receiver of subscriber telephone 12 remains on-hook, the ring current is bypassed through capacitor 161 and no current flows through the winding of relay 160. However, when the subscriber picks up the telephone while the phone is ringing, a DC circuit path is provided through relay 160 over the subscriber line and back through diode 29 of signalling circuit 20, thus providing a triggering voltage to the DC signalling circuit 20.

Thus, long line extender 10 may be used as a signalling circuit alone by merely using signalling circuit 20 or may include an additional feature of voice amplification by inserting hybrid amplifier 100 in circuit. Furthermore, a voltage booster circuit 60 may be utilized to further increase the voltage signalling circuit 20. Voltage booster circuit 60 may be used with or without amplifier 100. Lastly, a ring diverter circuit 140 is provided so that ring current may bypass signalling circuit 20 during the ring condition, merely by closing a series of parallel switches 142 and 148 which provides a direct path from the central office equipment 14 to the subscriber telephone 12.

Figure 3:
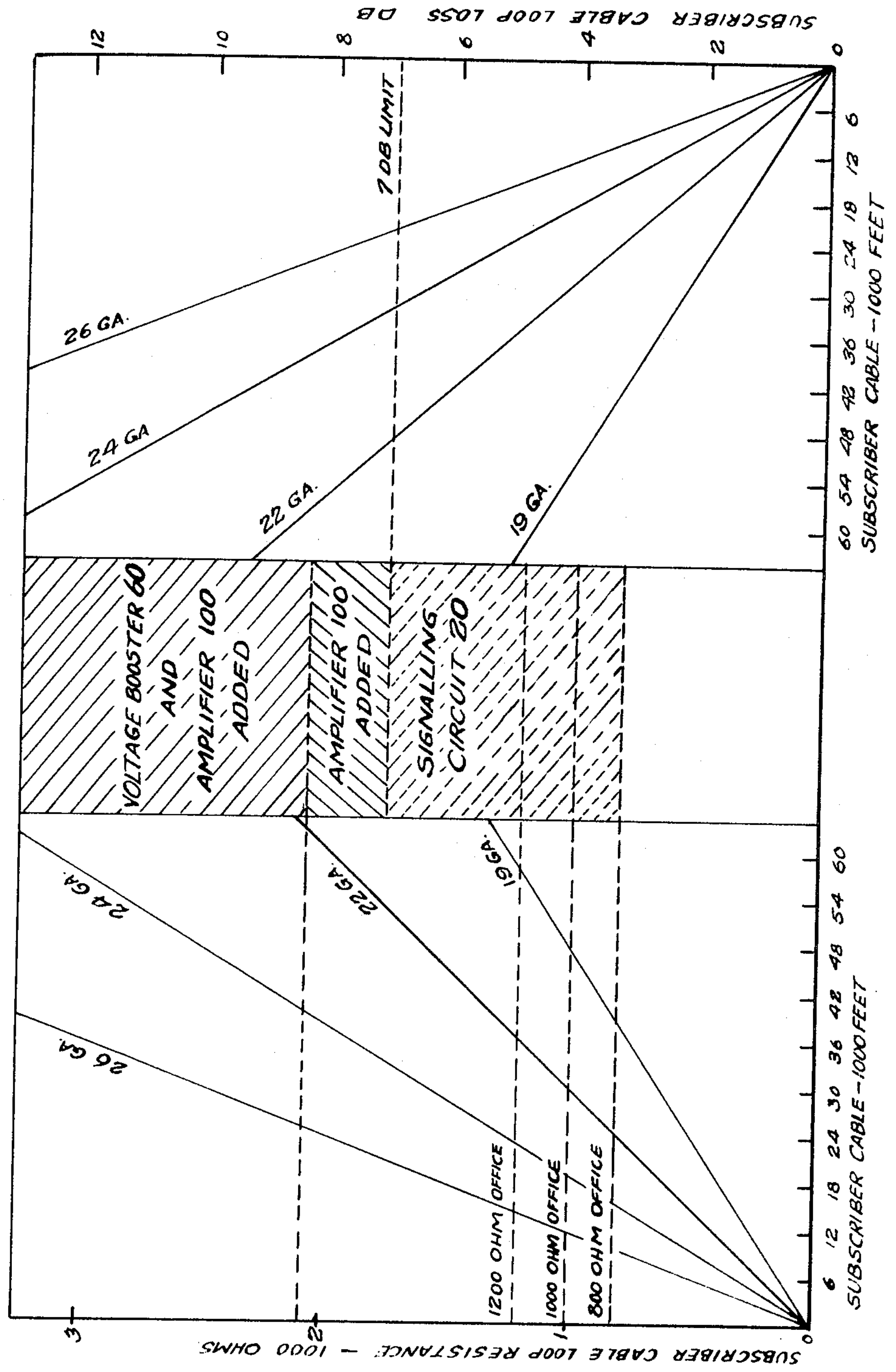
FIG. 3 is a graph plotting subscriber cable loop resistance versus subscriber cable length.

Referring now to FIG. 3 which plots the subscriber cable length versus both the subscriber cable loop resistance in ohms and the subscriber cable loop loss in decibels, the choice of modular component parts for long line extender 10 may readily be explained. For example, where the subscriber cable is 30,000 feet long, and the subscriber line is made from 24-gauge wire, the total resistance on the line could be plotted and would be approximately 1,500 ohms resistance. By plotting this point along the representative 24-gauge wire line, it can be seen that the signalling circuit 20 may be used alone to provide a sufficient long line extender for adequate operation. However, if the length of subscriber cable were increased 36,000 feet, it would then be necessary to further add amplifier 100 to signalling circuit 20, as can be seen in the graph. Similarly, if the length of subscriber cable were increased to 48,000 feet, then it would be necessary to add voltage booster 60 as well as amplifier 100 to the signalling circuit 20 and all three modular parts would comprise long line extender 10. If, on the other hand, however, the length of subscriber cable were, say, 18,000 feet, then no additional extender circuitry would be required since the loop resistance of the telephone would be sufficiently low to allow normal operation without any extender circuitry.

One specific embodiment of long line extender 10 that meets the afore-described requirements employs the following exemplary components:

| | |
|---|---|
| Inductor **26** | 12 henry–1200 ohms |
| Inductors **28, 30** | 1 henry–40 ohms |
| Transistor **30** | 2N2712 |
| Transistor **40** | 2N2712 |
| Transistor **44** | 2N2712 |
| Transistor **108** | 2N2712 |
| Transistor **112** | 2N2712 |
| Transistor **62** | 2N2646 |
| Transistor **66** | 2N2712 |
| SCR **80** | C6G |
| SCR **84** | C6G |
| Resistor **151** | 2200 ohms |
| Zener diode **152** | VR56 |
| Resistors **115, 215** | 1200 ohms |
| Capacitors **116, 216** | .047 μF |
| Capacitors **117, 217** | .033 μF |
| Capacitors **118, 218** | .018 μF |
| Capacitor **119** | .01 μF |
| Capacitor **219** | .047 μF |
| Resistor **71** | 470 ohms |
| Resistor **72** | 4700 ohms |
| Resistor **73** | 10K ohms |
| Capacitor **74** | .47 μF |

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A telephone long line extender for a subscriber loop to extend the operating limits for subscriber lines connecting a subscriber telephone to the central office equipment and the central office voltage source, comprising:

a first transistor, normally non-conductive;

a second transistor, normally conductive;

a third transistor, normally non-conductive;

a first normally open switch means operably connected to said central office equipment through a first inductor;

a relay winding connected in circuit with said third transistor wherein said relay winding is adapted to close said first switch means in response to a current flowing in said relay winding whereby said current flow from said subscriber telephone indicative of said off-hook condition causes said first transistor to conduct, causing said second transistor to be non-conductive thereby causing said third transistor to be conductive wherein a current is caused to flow through said relay winding thereby closing said switch means and providing a closed circuit through said inductor to said central office equipment indicative of said off-hook condition of said subscriber telephone and independent of any impedance in said subscriber loop;

a two-way hybrid amplifier providing two-way transmission between said subscriber telephone and said central office equipment;

second inductor means connected in said subscriber loop for isolating for isolating said first switch means, said first, second and third transistors and said relay winding from voice range audio frequency signals;

a voltage booster circuit means connected to said second inductor means for increasing the voltage in said subscriber line, said voltage booster circuit not requiring an additional source of voltage, wherein said voltage booster circuit is operative only during said off-hook condition of said subscriber telephone; and ring diverter means intermittently operable adapted to provide a path for a ringing current between said central office equipment and said subscriber telephone thereby bypassing said first transistor.

2. A telephone switching circuit having central office automatic billing equipment, a two-party subscriber line with a first and second subscriber telephone set wherein said second subscriber telephone has a ground connection introduced into said telephone when said telephone is in the off-hook position in combination with a long line extender including a subscriber loop, the improvement comprising:

a differential relay connected in said subscriber loop;

a normally open switch associated with said differential relay wherein said switch means closes when said differential relay is unbalanced; and means for connecting said differential relay to said two-party subscriber line wherein said differential relay remains balanced when said first telephone is in said off-hook condition and unbalances when said second telephone is in said off-hook condition thereby closing said switch and automatically identifying said second telephone in said off-hook position.

3. A telephone long line extender for a subscriber loop to extend the operating limits for a subscriber line connecting a subscriber telephone to the central office equipment and the central office voltage source, comprising:

a signalling circuit operably connected to break the DC continuity of the subscriber line and further operable in response to the current flow through said subscriber telephone when said subscriber telephone is placed in an off-hook condition to provide a closed circuit to said central office equipment indicative of said off-hook condition of said subscriber telephone and independent of any impedance in said subscriber loop, said signalling circuit having a first normally open switch means operably connected to said central office equipment, and a transistor control circuit connected to said first switch means and to said subscriber line wherein said transistor control circuit senses said off-hook condition of said subscriber telephone thereby causing said first switch means to close and thereby actuating said central office equipment by providing said closed circuit; and voltage booster means for increasing the voltage in said subscriber line, said voltage booster means not requiring an additional source of voltage and wherein said voltage booster means is operative only during said off-hook condition of said subscriber telephone.

4. The long line extender of claim 3 wherein said first switch means comprises a glass reed switch.

5. The long line extender of claim 3 wherein said transistor control circuit comprises:

a first transistor, normally non-conductive;

a relay winding connected in circuit with said first transistor wherein said first switch means is actuable in response to a current flowing in said relay winding; and a first inductor means connected to said first switch means wherein said current flow from said subscriber telephone indicative of said off-hook condition causes said first transistor to conduct, wherein a current is caused to flow through said relay winding thereby closing said first switch means and providing said closed circuit to said central office equipment through said first inductor means.

6. The long line extender of claim 5 further comprising a differential relay in said subscriber loop; and second normally open switch means associated with said differential relay wherein said second switch means closes when said differential relay is unbalanced and wherein said closure is indicative of a ground connection on said subscriber telephone in said off-hook position.

7. The long line extender of claim 6 wherein said second switch means comprises a second glass reed switch.

8. A telephone long line extender for a subscriber loop to extend the operating limits for a subscriber line connecting a subscriber telephone to the central office equipment and the central office voltage source, comprising:

a signalling circuit operably connected to break the DC continuity of the subscriber line and further operable in response to the current flow through said subscriber telephone when said subscriber telephone is placed in an off-hook condition to provide a closed circuit to said central office equipment indicative of said off-hook condition of said subscriber telephone and independent of any impedance in said subscriber loop, said signalling circuit including a first normally open switch means operably connected to said central office equipment, a first transistor normally non-conductive, a relay winding connected in circuit with said first transistor wherein said relay winding is adapted to close said first switch means in response to a current flowing in said relay winding, and a first inductor means connected to said first switch means wherein said current flow from said subscriber telephone indicative of said off-hook condition causes said first transistor to conduct, wherein a current is caused to flow through said relay winding thereby closing said first switch and providing said closed circuit to said central office equipment through said first inductor means;

a two-way hybrid amplifier for enabling two-way transmission between said subscriber telephone and said central office equipment; and means operably connected between said signalling circuit and said hybrid amplifier for isolating said signalling circuit from voice range audio frequency signals.

9. The long line extender of claim 8 wherein said isolation means comprises a differential relay connected in circuit with said subscriber loop.

10. The long line extender of claim 9 further comprising:

a second normally open switch means associated with said differential relay wherein said switch means closes when said differential relay is unbalanced and wherein said closure is indicative of a ground connection on said subscriber telephone in said off-hook position.

11. The long line extender of claim 10 wherein said second switch means comprises a second glass reed switch.

12. A telephone long line extender for a subscriber loop to extend the operating limits for a subscriber line connecting a subscriber telephone to the central office equipment and the central office voltage source, comprising:

a signalling circuit operably connected to break the DC continuity of the subscriber line and further operable in response to the current flow through said subscriber telephone when said subscriber telephone is placed in an off-hook condition to provide a closed circuit to said central office equipment indicative of said off-hook condition of said subscriber telephone and independent of any impedance in said subscriber loop;

a two-way hybrid amplifier for enabling two-way transmission between said subscriber telephone and said central office equipment;

means operably connected between said signalling circuit and said hybrid amplifier for isolating said signalling circuit from voice range audio frequency signals; and a voltage booster means for increasing the voltage in said subscriber line, said voltage booster means not requiring an additional source of voltage and wherein said voltage booster means is operative only during said off-hook condition of said subscriber telephone.

13. A telephone long line extender for a subscriber loop to extend the operating limits for a subscriber line connecting a subscriber telephone to the central office equipment and the central office voltage source, comprising:

a signalling circuit operably connected to break the DC continuity of the subscriber line and further operable in response to the current flow through said subscriber telephone when said subscriber telephone is placed in an off-hook condition to provide a closed circuit to said central office equipment indicative of said off-hook condition of said subscriber telephone and independent of any impedance in said subscriber loop, said signalling circuit including a first normally open switch means operably connected to said central office equipment, and a transistor control circuit connected to said first switch means and to said subscriber line wherein said transistor control circuit senses said off-hook condition of said subscriber telephone thereby causing said first switch means to close and thereby actuating said central office equipment by providing said closed circuit;

a two-way hybrid amplifier for enabling two-way transmission between said subscriber telephone and said central office equipment; and means operably connected between said signalling circuit and said hybrid amplifier for isolating said signalling circuit from voice range audio frequency signals.

* * * * *